(12) United States Patent
Lee et al.

(10) Patent No.: US 7,638,644 B2
(45) Date of Patent: Dec. 29, 2009

(54) LIGHT-COLOR PLANT OILS AND RELATED METHODS

(75) Inventors: Inmok Lee, Decatur, IL (US); Lisa Marie Pfalzgraf, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 11/686,068

(22) Filed: Mar. 14, 2007

(65) Prior Publication Data

US 2007/0260080 A1    Nov. 8, 2007

Related U.S. Application Data

(60) Provisional application No. 60/788,254, filed on Mar. 31, 2006.

(51) Int. Cl.
  *C11B 3/10*  (2006.01)
  *C11C 1/08*  (2006.01)
(52) U.S. Cl. .................................................... 554/175
(58) Field of Classification Search .................. 554/175
  See application file for complete search history.

(56) References Cited

U.S. PATENT DOCUMENTS

| | | | | |
|---|---|---|---|---|
| 2,525,702 | A | * | 10/1950 | Mattikow .................... 554/187 |
| 2,771,480 | A | | 11/1956 | Chasanov et al. |
| 2,863,890 | A | * | 12/1958 | Gutkin ........................ 554/187 |
| 4,443,379 | A | | 4/1984 | Taylor et al. |
| 4,808,426 | A | | 2/1989 | Strop et al. |
| 4,877,765 | A | | 10/1989 | Pryor et al. |
| 4,944,954 | A | | 7/1990 | Strop et al. |
| 5,278,325 | A | | 1/1994 | Strop et al. |
| 6,015,915 | A | * | 1/2000 | Jamil et al. ................. 554/184 |
| 6,313,328 | B1 | | 11/2001 | Ulrich et al. |
| 6,388,110 | B1 | | 5/2002 | Ulrich et al. |

FOREIGN PATENT DOCUMENTS

JP            44022177    * 12/1964

OTHER PUBLICATIONS

The Tintometer Limited, Colour Measurement, 2004, The TintometerLtd, pp. 4.*

Inoue, H. et al., Purifying rice-bran oils and rice-germ oils, Dec. 18, 1964, Japanese Patent Office, Abstract for JP44022177.*
Franzke et al., Effect of ion exhcangers on the content of natural pigmetns and tocopherol in vegetable oils, 1971, Nahrung, vol. 51, issue 1, (one page abstract).*
Dimova-Todorova et al., Coagulation of natural waters with modified ion exchangers, 2004, Desalination, vol. 164, pp. 71-76.*
Naz et al. "Deterioration of Olive, Corn, and Soybean Oils due to Air, Light, Heat and Deep-Frying." *Food Research International* 38 (2005), pp. 127-134.
Saghir et al. "Lipid Oxidation of Beef Fillets during Braising with Different Cooking Oils." *Meat Science* 71 (2005), pp. 440-445.
The Tintometer Limited, Colour Measurement, Edible Oils & Fats, Oleochemicals & Surfactants, Industrial Oils & Resins, Liquid Chemicals, Transparent Liquids, 2004, The Tintometer Ltd, pp. 1-12.
"Ion Exchange" in Kirk-Othmer Encyclopedia of Chemical Technology, Fourth Edition (vol. 14), p. 737-783; John Wiley & Sons, New York, 1995.
"Oven Storage Test for Accelerated Aging of Oils," in AOCS Recommended Practice Cg 5-97, reapproved 1997, pp. 1-2.
Antoniassi, Esteves, Jose de Almeida Meirelles, Pretreatment of Corn Oil for Physical Refining, JAOCS, vol. 75, No. 10, 1998, pp. 1411-1415, aEMBRAPA-CTAA, Rio de Janeiro, RJ, Brazil, CEP 23020-470, and bFaculdade de Engenharia de Alimentos—UNICAMP, Campinas, SP, Brazil.
Pericles Markakis, Food Colors, Food & Drug Administration, 200 C Street. S. W. Washington, DC 20204, pp. 105-120.
Robert A. Moreau, Corn Oil, United States Department of Agriculture, Agriculture Research Service, Retrieved from: www.knovel.com, Bailey's Industrial Oil and Fat Products, Sixth Edition, Six Volume Set. Edited by Fereidoon Shahidi. Copyright # 2005 John Wiley & Sons, Inc., pp. 149-172.
Roger D. O'Brien, Fats and Oils, Formulating and Processing for Applications, Third Edition, CRC Press, Taylor & Francis Group, New York, 2009, pp. 155.

* cited by examiner

*Primary Examiner*—Porfirio Nazario-Gonzalez
*Assistant Examiner*—Yate' K Cutliff
(74) *Attorney, Agent, or Firm*—K&L Gates LLP

(57) ABSTRACT

Methods of producing light-color, color stable plant oils are presented. Cationic ion exchange resins have been found to be effective in removing color bodies from plant oils to produce a light-color, color stable plant oil. The methods may be applied to plant oils, including corn oil. Color stable corn oils having a light color are also presented.

23 Claims, No Drawings

LIGHT-COLOR PLANT OILS AND RELATED METHODS

CROSS REFERENCE TO RELATED APPLICATIONS

This application claims the priority benefit of U.S. Provisional Patent Application No. 60/788,254, filed on Mar. 31, 2006, the disclosure of the entirety of which is incorporated herein by this reference.

TECHNICAL FIELD

The present disclosure provides refined plant oils having a light-color. Also disclosed are methods of refining and producing the plant oils having a light-color. The light-color oils produced herein may be color-stable plant oils.

BACKGROUND

Color is one of the most important quality factors of edible oils. Consumers generally prefer edible oils with a light color, since light color has been traditionally associated with a fresh, high quality plant oil. However, crude plant oils may have dark color associated with impurities and color bodies. To produce a light-colored plant oil, impurities and color bodies may be removed from the crude oil during refining or production.

Many of the color bodies present in plant oils occur naturally. As used herein, the terms "color body" and "color bodies" refer to a group(s) or molecule(s) present in an edible oil composition which imparts a color to the edible oil composition. Non-limiting examples of naturally occurring color bodies include carotenes, xanthophylls, and chlorophylls, including derivatives of chlorophylls, such as, pheophytin. In addition to naturally occurring color bodies, other color bodies may be generated during processing or refining of the plant oil. For example, certain color bodies in crude plant oils, such as, for example, crude corn oil, may be formed as a result of the Maillard reaction of various oil components during high temperature thermal treatment of the oilseeds prior to oil extraction. Other color bodies may develop due to mishandling of the plant oils or the oilseeds. Also, additional color bodies may be generated as oilseeds age before processing. Color bodies generated during processing, by mishandling, or by aging may be difficult to remove by conventional decolorization methods.

In addition to the color bodies described above, under certain conditions, plant oils that have been processed to yield a light-colored product may become darker upon storage. This darkening of plant oils during storage is known as "color reversion" in the industry. The degree of color change during storage may be dependent on various factors, such as, for example, raw seed quality, refining conditions, moisture content of oilseeds or refined oils, and storage conditions. For example, oxidation or polymerization of tocopherols, such as gamma-tocopherol, into colored compounds is believed to be a factor in the color reversion in some oils. Color reversion of oils may also vary according to oil type, with some oils requiring only a few hours to revert and other oils requiring up to several months. For example, refined corn oil is known in the industry to have a notoriously short color reversion induction time. Producing color-stable plant oils has been a major interest of the edible oil industry.

Oil colors are difficult to define and to measure. Several color measurement methods are currently used within the industry. One method of measuring the color of an oil is by color matching. For example, color matching using the Lovibond method (see, American Oil Chemist's Society ("AOCS") Method Cc 13b-45, Color Wesson Method Using Color Glasses Calibrated in Accordance with the AOCS-Tintometer Color Scale, the disclosure of which is incorporated in its entirety by reference herein) involving the use of yellow-tinted and red-tinted Lovibond glasses has been practiced for many years in the plant oil industry. More recently, automated Lovibond colorimeters have been developed to measure red and yellow color values based on an oil sample's absorption of light at specific wavelengths. Other methods of color measurement are also used in the industry.

Crude oils are typically refined prior to use. As used herein, the term "refining" refers to any purifying treatment designed to remove at least one of free fatty acids, phosphatides, color bodies, and other impurities from the oil. The refining of edible oils typically involves several steps. First the oils are extracted from the plant source, generally via pressing, for example using a continuous screw press, or by extraction with volatile solvents. For animal fats, rendering is used to separate the fat from the fatty tissues to obtain lard or tallow. The resulting oils and fats are comprised of triacylglycerols which are trimesters of fatty acids with glycerol. As used herein, the terms "triacylglycerols", "triacylglycerides", "triglycerides", "acyl glycerides", and "glycerides" are used interchangeably and refer to the tri-esters of fatty acids with glycerol. Refining of the edible oils may be via physical or chemical refining, or a combination of the two approaches.

Physical refining consists of removing the fatty acids from the crude oil by steam distillation under a vacuum after the phosphatides have been removed by a degumming process. Chemical refining, the conventional method for removal of the nonglyceride impurities from edible fats and oils, consists of a combination of optional degumming, alkali-refining, bleaching, and deodorizing. In chemical refining, alkali-refining (also known as caustic neutralization) is used to remove the free fatty acids from the crude oil in the form of soapstock. Alkali-refining may also remove phosphatides in the form of coagulated masses which may also entrain insoluble matter, and certain oil pigments may be degraded, absorbed or made water soluble by the alkali. The resulting soapstock and coagulated masses may be removed, for example, by centrifugation. Degumming typically involves mixing the crude oil composition with water to remove water soluble components. Degumming and alkali-refining may be done simultaneously in a process known as "crude-refining". Alkali-refining of glyceride oils may also be done in miscella in a process called miscella refining. As used herein, the term "miscella" means a mixture of the glyceride oil and a volatile organic solvent, such as, for example, hexane. In miscella refining, the oil/solvent miscella is refined by chemical refining, for example, by degumming (optionally), alkali-refining, bleaching, and deodorization. Miscella refining of oil has advantages over conventional refining techniques, such as, lower refining loss, better separation of the soapstock from the miscella mixture, and lighter-colored refined oil.

As discussed herein, conventional chemical and physical oil refining processes typically involve bleaching and deodorizing steps. Bleaching of edible fats and oils is regarded as the removal of non-glyceride impurities, including color bodies, from the composition. Although oils may be bleached chemically, the color reduction occurs generally by oxidation reactions which may have undesirable effects on the flavor and/or oxidative stability of the oil and, consequently, chemical bleaching is not used for edible oils. Conventional bleaching is by adsorption of the color bodies and other non-glyceride impurities, such as, metals, soaps, and phosphatides, on bleaching earth. Examples of bleaching earths include natural earths and clays, activated earths and clays, and activated carbon. Generally, the bleaching materials are added to the oil in a vessel followed by agitation, either at atmospheric pressure or under reduced pressure. The oil may be heated to a bleaching temperature and held, to allow contact time with the bleaching earth. After sufficient time has passed, the bleaching earth is removed from the oil, for example, by filtration or centrifugation.

Acid-activated bleaching clay has been used in conventional bleaching processes. For example, one commonly used acid-activated clay bleaching method is described in U.S. Pat. No. 4,443,379. While clay may be an efficient adsorbent for some natural color pigments, such as chlorophylls, bleaching clay is also known to catalyze some undesirable reactions during the bleaching process that may create some color bodies, known as "fixed color". Fixed color is not readily removed during the oil refining process and may impart an undesirable color to the oil. In addition, the use of higher dosages of bleaching clay may cause a quicker color reversion upon storage of the oil. Other adsorbents, such as acid-activated silica (U.S. Pat. No. 4,877,765), have been used for the removal of color bodies as well as other trace contaminants. However, silica has typically not provided very light color for corn oil. Activated carbon may remove some color bodies that are not easily removed by bleaching clays. However, activated carbons are expensive and are not effective in removing all types of color bodies, for example, certain color bodies present in corn oil.

Natural fats and oils may retain certain undesirable odors and flavors after refining. Thus, deodorizing may be necessary. Deodorizing is used to provide the bland flavor and odor expected by consumers and generally involves a high-temperature, high-vacuum, steam distillation process. During deodorization, further removal of certain color bodies may occur by heat bleaching of the color bodies.

Even though the bleaching and deodorization process removes color bodies, the process may also negatively affect the color of the bleached oil, especially when bleaching with acid-activated clay. Certain oil components, such as tocopherols, may be oxidized during the bleaching step, thereby generating precursors of color reversion. These precursors may be further oxidized during bleaching to become reverted color pigments. The reverted color pigments may be converted back to the precursors during deodorization due to the high heat resulting in an oil with an initially acceptable color. However, during storage of the deodorized oil, the precursors may again be converted back to color bodies resulting in color reversion. The extent of color reversion may be related to the dosage of bleaching clay, which is generally related to the degree of secondary oxidation of the oil, as measured by the para-anisidine value of the bleached oil. Other disadvantages of clay bleaching include the disposal of the spent clay, increased oil loss in the spent clay, and the fire hazard associated with spontaneous ignition of the spent bleaching clay.

Corn oil is obtained from corn germs, which are separated from corn kernels during wet corn milling. Dried corn germs contain about 50% oil by weight. In commercial settings, the germs are first pressed (expelled) to squeeze the oil out from the germ meal and then the meal may be further extracted with a non-polar solvent for maximum recovery of the crude corn oil. The ratio of expelled oil to extracted oil may be approximately 3:2.

Refined corn oil is known for its darker color. The dark color of refined corn oil is due, at least in part, to Maillard reaction products that are generated during corn processing before oil extraction. For example, melanoidins, such as, nitrogenous polymers, are dark brown colored substances generated by the Maillard reaction of amino acids and carbohydrates in the corn. Melanoidins are thought to be some of the unbleachable color pigments in finished corn oil. Corn oil color bodies are generally not easily removed from the oil during conventional refining processes and, as a result, conventionally refined corn oil will have a golden color. Corn oil is also known in the oil industry for its fast color reversion. The unbleachable color bodies and fast color reversion has prevented the vegetable industry from making light-colored corn oil with acceptable color stability. A stable and light-colored corn oil could be used in a wide range of food application where the darker color of corn oil has been an obstacle.

Because some of the unbleachable color bodies in the corn oil are believed to arise from abuse of the corn germ during wet milling, there have been efforts to process corn in a way that minimizes the damage during the corn processing prior to oil extraction. For example, U.S. Pat. No. 6,388,110 ("the '110 Patent") discloses a dry corn milling process that yields a lighter colored crude corn oil. The crude corn oil produced by this method was reported to have a lighter color than crude corn oil produced from conventional wet-milling processes. However, the '110 Patent does not disclose refining the crude corn oil to actually produce a finished light-colored, color stable, edible corn oil. U.S. Pat. No. 4,808,426 discloses a corn oil extraction process that yields a light-colored crude corn oil. However, the process utilizes vegetable oil as the extraction medium, which results in a high vegetable oil content in the corn meal.

Ion exchange compounds, such as resins, are generally classified according to three criteria: the nature of their functional groups; the chemistry of the matrix supporting the functional group; and the porosity of the matrix supporting the functional group ("Ion Exchange" in Kirk-Othmer Encyclopedia of Chemical Technology, Fourth Edition (vol. 14), p b737-741; John Wiley & Sons, New York, 1995). The four primary types of ion exchange functionality are strong acid, weak acid, weak base, and strong base. Strong acids or bases are generally differentiated from weak acids or bases by the ability of strong acids and bases to split neutral salts, such as sodium chloride. Solid ion exchangers are most often formed as resins. Acidic ion exchange resins, also known as cationic ion exchange resins, are often in the hydrogen form for use. In this form, when contacted with a liquid containing cations, hydrogen cations associated with the ion exchange resin are able to leave the solid phase and enter the liquid phase as they are exchanged with cations in the liquid phase. Basic ion exchange resins, also known as anionic ion exchange resins, are often in the hydroxide form. In this form, when contacted with a liquid containing anions, hydroxide anions associated with the ion exchange resin are able to leave the solid phase and enter the liquid phase as they are exchanged with anions in the liquid phase. In addition, other ion exchange resins may have the ability to chelate metals. Ion exchange interactions are reversible, which may allow regeneration procedures to return an ion exchanger to the desired form for reuse.

Anionic ion exchange resins are generally amine-based resins. Strong base anion exchange resins have functional groups comprising quaternary ammonium hydroxide groups. Weak base anion exchangers typically have functional groups comprising primary, secondary, or tertiary amines.

The use of basic, anionic ion exchange resins in a plant oil refining method is disclosed in U.S. Pat. No. 2,771,480 ("the '480 Patent"). The '480 Patent discloses refining plant oils with a basic anion exchange resin to reduce free fatty acids and some color pigments in the oil. The anionic exchange resin used in the '480 Patent is a strong base anion exchange resin containing quaternary ammonium hydroxide groups. The anionic exchange resin was primarily employed to remove free fatty acids. The anionic resin refining method of the '480 Patent was presented as an alternative to alkali-refining of the oil. Decolorization of the oil was an additional benefit of the process. Detailed measurement of the reduction in color was not presented.

Thus, conventional methods of refining and bleaching plant oils, and in particular, corn oil, do not provide a light-colored refined oil with color stability. New methods for producing light-colored oils with color stability are desired.

SUMMARY

Certain embodiments of the present disclosure describe methods of refining fats and oils, such as, plant oils, to give a light-color, color stable oil. Other embodiments describe compositions comprising corn oil, and corn oils having a color stable, light color.

One embodiment relates to a composition comprising a corn oil having a color value of less than 1.0 red on the Lovibond scale.

Another embodiment relates to a corn oil comprising a color value of less than 1.0 red on the Lovibond scale.

Yet another embodiment relates to a method for producing a decolorized plant oil. The method comprises contacting a composition comprising a plant oil and color bodies with a cationic ion exchange resin.

Further embodiments relate to a method for producing a decolorized corn oil. The method comprises: passing a composition comprising corn oil and a non-polar solvent through a bed of a cationic ion exchange resin to give a decolorized corn oil composition, wherein the cationic ion exchange resin binds to at least one of color bodies and impurities in the composition; collecting the decolorized corn oil composition; and removing the non-polar solvent from the decolorized corn oil composition to give a decolorized corn oil having at least one of a color value of less than 2.5 red on the Lovibond scale and a color value of less than 60.0 yellow on the Lovibond scale. Still further embodiments include corn oils produced by the various methods described herein.

Still further embodiments relate to a cationic ion exchange resin decolorized corn oil. The cationic ion exchange resin decolorized corn oil may have a red color value change ($\Delta R$) of from 0.4 to 15 on the Lovibond scale.

DETAILED DESCRIPTION

The present disclosure presents new methods for the production of refined light-colored, color stable, plant oils. The methods include reacting crude plant oils with a cationic ion exchange resin to remove colored bodies and provide the light-colored, color stable, oil. Methods for producing a light-color, color stable corn oil and color stable corn oils having light-color are also presented.

Other than in the operating examples, or where otherwise indicated, all numbers recited herein expressing quantities of ingredients, reaction conditions and the like are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Also, unless denoted otherwise, percentages of components in a composition are presented as weight percent.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

As discussed herein, consumers generally prefer edible oils to have a light color. Conventional methods for removing color bodies from refined plant oils involve the use of bleaching clay to adsorb the color bodies. However, with certain oils, for example, corn oil, clay bleaching may not provide a satisfactory light-colored, color stable oil. In the present disclosure the inventors disclose a method for the removal of color bodies from oils using cationic ion exchange resins. According to the embodiments of the present disclosure, color bodies in plant oils were efficiently removed by a cationic ion exchange resin. According to certain embodiments, strong cationic ion exchange resins were used to remove the colored bodies from the plant oil. In contrast to the anionic exchange resins of the '480 Patent, cationic ion exchange resins do not react with free fatty acid residues in the plant oil, so that active sites on the cationic ion exchange resin are not reacted with or occupied by the fatty acids.

Various methods for producing a decolorized plant oil will now be discussed. According to certain embodiments, the method for producing a decolorized plant oil may comprise contacting a composition comprising a plant oil and color bodies with a cationic ion exchange resin to give a decolorized plant oil composition. According to other embodiments, the decolorized plant oil may also be a color stable decolorized plant oil. As used herein, the term "decolorized" means a triglyceride oil or fat that has been treated by a process that removes color bodies to afford a light-colored oil.

According to certain embodiments, the color reduction by the cationic exchange resins was sufficiently effective that no clay bleaching was necessary to produce a light-color, color stable plant oil. As used herein, the term "clay bleaching" includes any bleaching process where the oil is bleached with an earth, clay, and/or carbon bleaching substance, such as, a conventional bleaching process. In other embodiments, the methods may include bleaching the plant oil with bleaching substance, such as, for example, natural earth or clay, activated earth or clay, and/or activated carbon, in addition to contacting the composition comprising a plant oil and color bodies with a cationic ion exchange resin.

As discussed herein, cationic ion exchange resins may be classified as a strong cationic ion exchange resin or a weak cationic ion exchange resin. The cationic exchange resins differ in the ionizable group attached to the hydrocarbon network. Strong cationic exchange resins are so named because their chemical behavior is similar to that of a strong acid. Strong cationic resins comprise sulfonic acid functionality (—$SO_3H$), typically in the acidic or sodium salt form, and are highly dissociated and exchangeable over the entire pH range. Weak cationic exchange resins comprise carboxylic acid functionality (—COOH) and behave similarly to weak organic acids that are weakly dissociated. According to certain embodiments of the methods, the cationic ion exchange resin may be a strong cationic ion exchange resin, a weak cationic ion exchange resin, or a mixture of both a strong and weak cationic ion exchange resin. According to other embodiments, the cationic ion exchange resin may be a strong cationic ion exchange resin. Non-limiting examples of suitable strong cationic ion exchange resins include sulfonated resins, such as, but not limited to Dowex Monosphere® 88 (commercially available from Dow Chemical Co., Midland, Mich.), Dowex N406® (commercially available from Dow Chemical Co., Midland, Mich.), Dow XUS 43569™ (commercially available from Dow Chemical Co., Midland, Mich.), Purolite MN500™ (commercially available from The Purolite Co., Bala Cynwyd, Pa.), Purolite SST-60™ (commercially available from The Purolite Co., Bala Cynwyd, Pa.), Purolite C100™ (commercially available from The Purolite Co., Bala Cynwyd, Pa.), Purolite C100H™ (commercially available from The Purolite Co., Bala Cynwyd, Pa.), Purolite C100E™ (commercially available from The Purolite Co., Bala Cynwyd, Pa.), Purolite C100X10™ (commercially available from The Purolite Co., Bala Cynwyd, Pa.), Purolite C145™ (commercially available from The Purolite Co., Bala Cynwyd, Pa.), Purolite C147™ (commercially available from The Purolite Co., Bala Cynwyd, Pa.), Purolite C150™ (commercially available from The Purolite Co., Bala Cynwyd, Pa.), Purolite C150H™ (commercially available from The Purolite Co., Bala Cynwyd, Pa.), Purolite C155™ (commercially available from The Purolite Co., Bala Cynwyd, Pa.), Purolite C160™ (commercially available from The Purolite Co., Bala Cynwyd, Pa.), Purolite C160H™ (commercially available from The Purolite Co., Bala Cynwyd, Pa.), Amberlite® 200 Na (commercially available from Rohm & Haas Corp., Philadelphia, Pa.), Amberlite® 1200 Na (commercially available from Rohm & Haas Corp., Philadelphia, Pa.), Amberlyst® 15 WET (commercially available from Rohm & Haas Corp., Philadelphia, Pa.), Amberlyst® 16 WET (commercially available from Rohm & Haas Corp., Philadelphia, Pa.), Amberlyst® 131 WET (commercially available from Rohm & Haas Corp., Philadelphia, Pa.), Mitsubishi DIAION® SK1B (commercially available from Mitsubishi Chemical Corp, Tokyo, Japan), Mitsubishi DIAION® SK104 (commercially available from Mitsubishi Chemical Corp, Tokyo, Japan), Mitsubishi DIAION® SK110 (commercially available from Mitsubishi Chemical Corp, Tokyo, Japan), Mitsubishi DIAION® SK112 (commercially available from Mitsubishi Chemical Corp, Tokyo, Japan), Mitsubishi DIAION® SK116 (commercially available from Mitsubishi Chemical Corp, Tokyo, Japan), Mitsubishi DIAION® PK208 (commercially available from Mitsubishi Chemical Corp, Tokyo, Japan), Mitsubishi DIAION® PK212 (commercially available from Mitsubishi Chemical Corp, Tokyo, Japan), Mitsubishi DIAION® PK216 (commercially available from Mitsubishi Chemical Corp, Tokyo, Japan), Mitsubishi DIAION® PK220 (commercially available from Mitsubishi Chemical Corp, Tokyo, Japan), Mitsubishi DIAION® PK228 (commercially available from Mitsubishi Chemical Corp, Tokyo, Japan), Mitsubishi DIAION® HPK25 (commercially available from Mitsubishi Chemical Corp, Tokyo, Japan), Mitsubishi RAD/F® (commercially available from Mitsubishi Chemical Corp, Tokyo, Japan), Mitsubishi EXC04™ (available from Mitsubishi Chemical Corp, Tokyo, Japan), and Finax CS24 (available from Finax Ltd., Kotka, Finland).

Traditionally, ion exchangers are most often used in aqueous conditions. However, ion exchange resins containing water may present difficulties in contacting a lipid, such as a triglyceride. According to certain embodiments of the methods, the cationic ion exchange resin may be a dried cationic ion exchange resin. As used herein, a "dried cationic ion exchange resin" is a cationic ion exchange resin that is substantially free of water. According to certain embodiments, the dried cationic ion exchange resin has less than 15% moisture. According to other embodiments, the dried cationic ion exchange resin contains from 5% to 15% moisture.

The cationic ion exchange resins may be dried by any conventional method for removing excess water from ion exchange resins, such as, for example, oven drying (i.e., drying by heating including heating under reduced pressure), lyophilization, and/or by contacting the resin with a gradient solvent system. For example, according to certain embodiments, the cationic exchange resin may be oven dried by placing the resin in an oven, for example, an oven at a temperature of 50° C. to 150° C. and a pressure of from 1 torr to 760 torr for a time of at least 30 minutes. In one embodiment oven drying at 70° C. for 12 hours may provide a dried ion exchange resin containing less than 15% moisture. According to another embodiment, oven drying at 70° C. for 12 hours may provide a dried ion exchange resin containing from 5% to 15% moisture. According to other embodiments, the cationic exchange resin may be dried by contacting the resin with a gradient solvent system, with a hydrophilic to hydrophobic solvent gradient. For example, the cationic exchange resin may be dried by washing the resin with a water-miscible solvent, followed by washing with a water-immiscible solvent having miscibility with the plant oil. The water-immiscible solvent may be displaced by the plant oil or, alternatively, removed from the resin by evaporation, such as, by passing a dry gas through the resin or placing the resin in under reduced pressure and, optionally, heating. For example, one possible gradient solvent system may comprise passing a succession of increasingly non-polar dry solvents through the wet resin bed, such as, for example, ethanol followed by hexane. Other methods that provide a sufficiently dried cationic ion exchange resin may also be employed.

The methods of the present disclosure may be suitable for the removal of color bodies from triglycerides and/or triglyceride containing compositions. According to various embodiments the triglycerides or triglyceride containing compositions may comprise triglycerides from an animal fat, a plant oil, or a mixture thereof. According to certain embodiments, the methods of the present disclosure may be suitable for the removal of color bodies from triglycerides or triglyceride containing compositions, where the triglyceride is a plant oil.

Plant oils suitable for use in the various embodiments of the methods disclosed herein may be selected from the group consisting of corn oil, soybean oil, canola oil, vegetable oil, safflower oil, sunflower oil, nasturtium seed oil, mustard seed oil, olive oil, sesame oil, peanut oil, cottonseed oil, rice bran oil, babassu nut oil, castor oil, palm oil, palm kernel oil, rapeseed oil, low erucic acid rapeseed oil, lupin oil, jatropha oil, coconut oil, flaxseed oil, evening primrose oil, jojoba oil, cocoa butter, fractions of any thereof, and mixtures of any thereof. According to certain embodiments, the plant oil is corn oil.

According to certain embodiment of the methods of the present disclosure, the composition comprising a plant oil and color bodies may comprise a neat plant oil. As used herein, the term "neat plant oil" means any plant oil that is substantially free of solvent (i.e., contains, at most, only trace amounts of solvent), such as, a crude plant oil, degummed oil, superdegummed oil, once-refined plant oil, crude-refined plant oil, refined plant oil, bleached plant oil, and refined, bleached deodorized ("RBD") plant oil, that are substantially free of all solvent, such as an organic solvent. For example, neat plant oil may comprise the crude plant oil obtained by pressing the oilseeds or by extracting the oil from the oilseeds with an organic solvent, followed by removal of the solvent.

According to other embodiments, the composition comprising the plant oil and color bodies may further comprise a non-polar organic solvent. According to certain embodiments, the composition may comprise a miscella mixture of crude plant oil and a non-polar organic solvent, for example, oil resulting from miscella refining of plant oil. Examples of non-polar organic solvents suitable for miscella refining of plant oil may be selected from the group consisting of pentane, hexane, heptane, octane, petroleum ether, isomers of any thereof and mixtures of any thereof According to other embodiments, the composition comprising the plant oil and color bodies may comprise crude oil resulting from the removal of an extraction solvent from a mixture of solvent and crude oil obtained in an extraction step. According to other embodiments, the composition comprising the plant oil and color bodies may comprise degummed oil resulting from degumming a crude oil obtained by pressing and/or extraction followed by removal of extraction solvent from a mixture of solvent and crude oil obtained from an extraction step. According to other embodiments, the composition comprising the plant oil and color bodies may comprise once-refined oil resulting from the alkali-refining of crude oil obtained by pressing and/or extraction, optionally followed by removal of extraction solvent from a mixture of solvent and crude oil obtained in an extraction step. According to other embodiments, the composition comprising the plant oil and color bodies may comprise refined, bleached oil resulting from the bleaching of once-refined oil. According to still other embodiments, the composition comprising the plant oil and color bodies may comprise RBD oil resulting from the deodorizing of once-refined or refined, bleached oil. According to various embodiments where the composition further comprises a non-polar organic solvent, the method may further comprise the step of removing the non-polar organic solvent from the decolorized plant oil composition to give a decolorized plant oil.

According to certain embodiments, contacting the composition comprising the plant oil and color bodies with a cationic ion exchange resin may be performed in a reactor selected from the group consisting of a batch reactor, a semi-continuous reactor, a continuous reactor, and combinations thereof.

According to certain embodiments, the composition may be contacted with the cationic exchange resin in a batch reactor. According to certain embodiments, contacting the composition comprising the plant oil and color bodies with a cationic ion exchange resin in a batch reactor may comprise contacting the composition with the exchange resin with agitation, such as, for example, shaking, swirling, or stirring. For example, according to certain embodiments, the cationic exchange resin may be mixed with or suspended in the crude plant oil composition and the mixture or suspension may then be agitated by a stirring mechanism, such as, for example, an impeller, such as a shaft-driven impeller, a stirring motor, stirring bar, or overhead stirrer or by a shaking mechanism, such as, for example, a wrist-action shaker.

According to other embodiments, the composition may be contacted with the cationic ion exchange resin in a continuous reactor. According to certain embodiments, contacting the composition comprising the plant oil and color bodies with a cationic ion exchange resin in a continuous reactor may comprise passing the composition through the cationic ion exchange resin. For example, according to certain embodiments, passing the composition through the cationic ion exchange resin may comprise passing the composition through a column of the cationic ion exchange resin. In other embodiments, the composition may be passed through a bed of the cationic ion exchange resin. In certain embodiments wherein the composition is passed through a column of the cationic resin, the ratio of resin volume to column diameter may be 15 milliliter ("mL") of the cationic ion exchange resin per centimeter ("cm") of column diameter to 50 mL of resin per cm of column diameter. According to certain embodiments, the ratio of column height to column diameter may range from 1:1 to 12:1. In other embodiments, the ratio of column height to column diameter may be 6:1. As used herein, "column height" means the height or path length of the resin within the column and "column diameter" means the diameter of the resin within the column.

According to another embodiment, several columns of the resin may be supplied in parallel or in series. According to those embodiments where the columns are in parallel, when one column is spent, flow may be diverted to a fresh column for uninterrupted treatment of the composition. As discussed herein, according to certain embodiments, the spent column may be regenerated before being returned to service. In another embodiment, the treatment and regeneration process may be automated. In another embodiment, the continuous process may be automated. According to certain embodiments, the continuous automated process may comprise simulated moving bed chromatography.

According to the various embodiments of the methods, as the composition comprising the plant oil and color bodies is contacted with the cationic ion exchange resin, at least a portion of the color bodies are removed from the composition comprising plant oil and color bodies, such as, by binding to or reacting with the cationic ion exchange resin. As used herein, the term "binding to" means the color bodies form at least one of a covalent bond, a hydrogen bond, or ionic bond (or electrostatic interaction) with the active functionality of the cationic ion exchange resin. As used herein, when the color bodies are removed by "reacting with" the exchange resin, the color bodies may be converted to a non-colored or lighter-colored compound. According to certain embodiments, when the composition is contacted with the cationic ion exchange resin, a substantial portion of the color bodies bind to or react with the cationic ion exchange resin. Binding to or reacting the color bodies with the cationic ion exchange resin may be indicated by a darkening of the color of the ion exchange resin and/or a lightening of the color of the crude plant oil composition.

According to various embodiments of the methods for producing a decolorized plant oil, the methods may further comprise removing the decolorized plant oil composition from the cationic ion exchange resin, wherein at least a portion of the color bodies bind to the cationic ion exchange resin. According to these embodiments, as the decolorized plant oil composition is removed from the cationic ion exchange resin, the color bodies remain with the resin and are therefore removed from the plant oil composition.

The decolorized plant oil composition may be removed from the cationic ion exchange resin by any suitable method. For example, according to certain embodiments, removing the decolorized plant oil composition from the cationic ion exchange resin may comprise one of decanting the decolorized plant oil composition from the cationic ion exchange resin, filtering the decolorized plant oil composition from the cationic ion exchange resin, centrifuging the decolorized plant oil composition from the cationic ion exchange resin, and passing the decolorized plant oil composition through the cationic ion exchange resin. For example, when the composition comprising a plant oil and color bodies is passed through a column or bed of the cationic ion exchange resin, the decolorized plant oil composition exits from the column and the cationic ion exchange resins and the at least a portion of the color bodies bound thereto remain in the column or bed.

As discussed herein, ion exchange resins, such as cationic ion exchange resins, may be regenerated to return the ion exchange resin to its desired form for reuse. According to certain embodiments, the methods of producing a decolorized plant oil may further comprise regenerating the cationic ion exchange resin after removing the decolorized plant oil composition from the cationic ion exchange resin. According to various embodiments, regenerating the cationic ion exchange resin may comprise removing at least a portion of the color bodies bound to the cationic ion exchange resin from the resin. After the cationic ion exchange resin has been regenerated (i.e., had at least a portion of the color bodies removed therefrom), the regenerated cationic ion exchange resin may be resubmitted to the method. That is, the regenerated cationic ion exchange resin may be contacted with a composition comprising plant oil and color bodies to give a decolorized plant oil composition. Cationic ion exchange resins may be regenerated by any conventional method known in the art, such as, for example, flushing or contacting the cationic ion exchange resin with color bodies bound thereto with an acid, for example a strong inorganic acid, such as, hydrochloric acid, sulfuric acid, nitric acid, phosphoric acid, and the like. Regeneration of the cationic ion exchange resin may be indicated by lightening of the color of the resin.

According to various embodiments of the method for producing a decolorized plant oil, the method may further comprise deodorizing the decolorized plant oil composition. As discussed herein, deodorization of triglyceride oils may be used to provide the bland flavor and odor expected by consumers and generally involves a high-temperature, high-vacuum, steam distillation process. Deodorizing the decolorized plant oil composition may also degrade certain remaining color bodies in the decolorized plant oil composition, for example, by heat bleaching of the remaining color bodies. As discussed herein, the plant oil that is degraded by deodorizing may revert to a color body over time. According to certain embodiments, the methods of the present disclosure may prevent reversion of the degraded color body, for example, by removing the degraded color body or otherwise preventing the reversion process. According to certain embodiments, deodorizing the decolorized plant oil composition may comprise heating the decolorized plant oil composition at a temperature of 180° C. to 280° C. and a pressure of 0.5 torr to 10.0 torr for 5 minutes to 120 minutes.

According to various embodiments of the methods for producing a decolorized plant oil, the methods may further comprise alkali-refining the composition comprising a plant oil and color bodies prior to contacting the composition comprising a plant oil and color bodies with the cationic ion exchange resin. As discussed herein, alkali-refining involves contacting the crude plant oil composition with an aqueous solution of a strong alkali, such as, sodium hydroxide, potassium hydroxide, and the like. Alkali-refining may be used to remove free fatty acids, phosphatides, insoluble matter, and certain oil pigments from the crude oil prior to contacting the crude oil composition with the cationic ion exchange resin. According to certain embodiments, alkali-refining of the crude oil composition may also be done on miscella (i.e., an oil/non-polar solvent solution). According to other embodiments, the methods may further comprise degumming the composition comprising the plant oil and color bodies prior to contacting the composition comprising a plant oil and color bodies with the cationic ion exchange resin. Degumming may consist of contacting the crude oil composition with water or an aqueous solution, for example, a dilute aqueous solution. According to certain embodiments of the method, degumming and alkali-refining may be done simultaneously during "crude-refining".

In addition to the various methods for producing a decolorized plant oil set forth above, when a very light oil is desired the methods may further comprise bleaching the decolorized oil with a bleaching material as set forth herein, such as, for example, a natural earth or clay, an activated earth or clay, activated carbon, or silica. Bleaching the oil composition may be done prior to or after contacting the composition comprising the plant oil with the cationic ion exchange resin discussed herein.

Other embodiments of the present disclosure include methods for producing a decolorized corn oil. The methods for producing a decolorized corn oil may comprise: passing a composition comprising crude corn oil, such as, for example, miscella refined corn oil, once-refined corn oil, crude-refined corn oil, degummed corn oil, refined and bleached corn oil, and RBD corn oil, and a non-polar solvent through a bed of a cationic ion exchange resin, such as, for example, a dried cationic ion exchange resin, to give a decolorized corn oil composition; collecting the decolorized corn oil composition; and removing the non-polar solvent from the decolorized corn oil composition, for example, by evaporation, to give a decolorized corn oil. The cationic exchange resin, according to the various embodiments of these methods, may bind to at least one of color bodies and impurities in the crude corn oil composition. According to certain embodiments, the cationic ion exchange resin removes at least a portion of the color bodies in the crude corn oil composition. In certain embodiments, the crude corn oil may be corn oil miscella and removing the non-polar solvent from the decolorized corn may also comprise removing the miscella solvent from the decolorized corn. According to various embodiments, the decolorized corn oil may also be a color stable corn oil.

Still other embodiments of the methods for producing a decolorized corn oil may comprise: passing a composition comprising a neat crude corn oil through a bed of a cationic ion exchange resin to give a decolorized neat corn oil. According to certain embodiments, the neat crude corn oil and/or the cationic ion exchange resin may be heated, for example, to reduce the viscosity of the corn oil. For example, according to one embodiment the neat crude corn oil (which may or may not be pre-heated) may be passed through a heated column of the cationic ion exchange resin.

According to certain embodiments, the decolorized corn oil produced by the various embodiments of the methods disclosed herein may have at least one of a color value of less than 2.5 red on the Lovibond scale and a color value of less than 60.0 yellow oil the Lovibond scale. According to some embodiments the decolorized corn oil may have a color value of less than 1.0 red on the Lovibond scale. According to other embodiments, the color value of the decolorized corn oil may be less than 0.8 red on the Lovibond scale. According to still other embodiments, the color value of the decolorized oil may be less than 0.6 red on the Lovibond scale. According to certain embodiments, the corn oil may have a color value of less than 10.0 yellow on the Lovibond scale. It will be understood by one having ordinary skill in the art, that other methods for measuring the color of the corn oils produced by the methods herein may be used in place of the Lovibond method and that the method of measuring the color of the light-color corn oil is not limiting on the methods of corn oil processing and the corn oils produced herein. Thus, other methods of color measurement methods may be used provided the measured colors are the equivalent of the Lovibond color values recited herein.

According to various embodiments, the method of producing a decolorized corn oil may further comprise deodorizing the decolorized corn oil after removal of the non-polar solvent from the decolorized corn oil composition. For example, according to certain embodiments, deodorizing may be performed on the decolorized corn oil at a temperature of 180° C. to 280° C. and a pressure of 0.5 torr to 10.0 torr for 5 minutes to 120 minutes.

The various method for producing a decolorized corn oil may further comprise any of the following steps, as discussed herein: degumming the crude corn oil composition, alkali-refining the crude corn oil composition, and regenerating the cationic ion exchange resin.

The present disclosure also includes color stable decolorized corn oils produced by any of the methods disclosed herein. For example, the present disclosure includes a color stable decolorized corn oil produced by the process comprising: passing a composition comprising corn oil and a non-polar solvent through a bed of a cationic ion exchange resin to give a decolorized corn oil composition, wherein the cationic ion exchange resin binds to at least one of color bodies and impurities in the composition; collecting the decolorized corn oil composition; and removing the non-polar solvent from the decolorized corn oil composition to give the decolorized corn oil. According to various embodiments, the decolorized corn oil may comprise crude corn oil, once-refined corn oil, crude-refined corn oil, degummed corn oil, corn oil miscella, refined and bleached corn oil, and RBD corn oil. According to certain embodiments, the decolorized corn oil has at least one of a color value of less than 2.5 red on the Lovibond scale and a color value of less than 60.0 yellow on the Lovibond scale. According to one embodiment the decolorized corn oil has a color value of less than 1.0 red on the Lovibond scale. According to another embodiment, the color value is less than 0.8 red on the Lovibond scale. According to other embodiments, the decolorized corn oil may have at least one of a color value of less than 0.6 red on the Lovibond scale and a color value of less than 10.0 yellow on the Lovibond scale.

As discussed herein, consumers generally prefer edible oils to have a light color However, corn oil is notorious in the industry for its darker color and difficulty in attaining a refined corn oil having a light-color. According to various embodiments, the present disclosure presents a composition comprising a corn oil having a color value of less than 1.0 red on the Lovibond scale. According to other embodiments, the composition comprises a corn oil having a color value of less than 0.8 red on the Lovibond scale. According to still other embodiments, the composition comprises a corn oil having a color value of less than 0.6 red on the Lovibond scale. The compositions of the various embodiments may also comprise corn oil having a color value of less than 10.0 yellow on the Lovibond scale.

According to other embodiments, the compositions may comprise a corn oil having a low red color, as measured by the Lovibond method, and a free fatty acid content of less than 0.050% by weight. According to another embodiment, the corn oil has at least one of a reduced peroxide value, a reduced para-anisidine value, a reduced conjugated diene content, and a reduced trace metal content, as compared to conventionally refined corn oil (i.e., refined, bleached and deodorized ("RBD") corn oil). According to other embodiments, the compositions may comprise a corn oil having a low red color, as measured by the Lovibond method, and a para-anisidine value of less than 5.

According to other embodiments, the present disclosure includes a corn oil comprising a color value of less than 1.0 red on the Lovibond scale; in other embodiments, the corn oil may have a color value of less than 0.8 red on the Lovibond scale; and in still other embodiments, the corn oil may have a color value of less than 0.6 red on the Lovibond scale. According to still other embodiments, in addition to the low red color values, the corn oil may also have a color value of less than 10.0 yellow on the Lovibond scale.

As discussed herein, color reversion is a problem with plant oils, such as corn oils, processed using conventional RBD refining methods. According to various embodiments, the present disclosure provides plant oils, including the corn oils and compositions comprising the corn oil described herein, wherein the plant oil is particularly color stable (i.e., not as prone to color reversion as conventionally refined plant oils). Color stability may be measured as the heated color and the aged color. The plant oils, corn oils and compositions of the present disclosure may have a high color stability (i.e., they did not darken upon heating and/or aging, compared to conventionally refined oils).

The heated color of an oil may be measured as follows: heated color may be measured after the corn oil has been heated to 160° C. on a pre-warmed hot plate with gentle stirring, removed from the heat when the oil temperature reaches 160° C., and allowed to cool to about room temperature. According to certain embodiments, the corn oils and corn oil compositions of the present disclosure had a heated color of less than 1.0 red on the Lovibond scale after heating to 160° C. as described herein. Aged color measurement uses an accelerated test for an indicator of color reversion of an oil during storage. One method for measuring aged color is set forth in AOCS Recommended Practice Cg 5-97 "Oven Storage Test for Accelerated Aging of Oils", the disclosure of which is incorporated herein by reference. The AOCS Recommended Practice includes storing the oil at approximately 60° C. in a dark container for specified periods of time and measuring the color change after those specified times, for example 3,5, and 7 days of storage. According to certain embodiments, the corn oils and corn oil compositions of the present disclosure had a Lovibond color value of less than 2.5 red after storing at 63° C. for 7 days. The corn oils and corn oil compositions had a Lovibond color value of less than 30.0 yellow after storing at 63° C. for 7 days.

Still other embodiments of the present disclosure include cationic ion exchange resin decolorized corn oil. According to certain embodiments, the cationic ion exchange resin decolorized corn oil may be decolorized by any of the methods disclosed herein. The cationic ion exchange resin decolorized corn oil may have a reduced red color value as measured on the Lovibond color scale. The change in the red color value may be measured by a ΔR value. As used herein, the ΔR.

value may be calculated by subtracting the Lovibond red color value of the decolorized corn oil from the Lovibond red color value for the crude corn oil. The ΔR value may also be calculated by subtracting the Lovibond red color value of the decolorized corn oil from the Lovibond red color value of corn oil before being subjected to the cationic ion exchange resin decolorization step, as described herein. According to certain embodiments, the cationic ion exchange resin decolorized may have a red color value change (ΔR) of from 0.4 to 15 on the Lovibond scale.

Various embodiments of the present disclosure will be better understood when read in conjunction with the following non-limiting Examples. The procedures set forth in the Examples below are not intended to be limiting herein, as those skilled in the art will appreciate that various modifications to the procedures set forth in the Examples, as well as to other procedures not described in the Examples, may be useful in practicing the invention as described herein and set forth in the appended claims.

EXAMPLES

Example 1

In this example, various ion exchange resins were pre-screened in a batch mode to select the resins that provide the lightest colored plant oil. Ion exchange resins with various functionalities (i.e., strong acid and base, and weak acid and base) and chemical matrices from various suppliers were screened with a miscella created by adding hexane to alkali-refined corn oil.

Prior to testing, the resins were dried in a drying oven at 80° C. overnight. For pre-screening, the resins (60 mL) were placed in a high density polyethylene bottle (235 mL) with 100 ml miscella formed by mixing crude-refined corn oil and hexane (1:1 oil:hexane by volume). The bottles were agitated by a wrist-action shaker at medium speed for 1 hr at room temperature. The oil/hexane mixture was separated from the resin and the color of the oil/hexane miscella was measured in a 1 inch (25.4 mm) cell with an automated Lovibond Tintometer PFX990.

The color of the treated corn oils for each resin type are presented in Table 1.1-1.4. Significant physical changes, such as swelling, were observed with some of the resin. Cationic ion exchange resins showed greater color reduction of the corn oil than anionic ion exchange resins. The 19 resins that displayed the highest color reduction were submitted for further testing.

TABLE 1.1

Color Values of Corn Oil Treated with Resins Available from Mitsubishi Chemical Corp, Tokyo, Japan.

| | Feed oil | |
|---|---|---|
| Resin | Red 1.6 | Yellow 69.0 |
| EXC04 | 0.3 | 2.3 |
| SP825L | 1.1 | 39.0 |
| SP207 | 1.1 | 27.0 |
| HP20 | 1.1 | 39.0 |
| SP850 | 1.1 | 39.0 |
| HP2MGL | 1.0 | 16.0 |
| WK10 | 1.4 | 57.0 |
| PA308 | 1.5 | 69.0 |
| HPA25 | 1.1 | 39.0 |
| EX8001 | 1.0 | 16.0 |
| WA30 | 1.2 | 31.0 |
| SKL10 | 1.5 | 57.0 |
| PA306S | 1.4 | 69.0 |
| CR20 | 1.1 | 27.0 |

TABLE 1.2

Color Values of Corn Oil Treated with Resins Available from the Purolite Co., Bala Cynwyd, Pennsylvania.

| | Feed oil | |
|---|---|---|
| Resin | Red 1.8 | Yellow 63.0 |
| MN500 | 0.7 | 6.2 |
| MN400 | 0.8 | 14.0 |
| MN150 | 1.0 | 23.0 |
| MN100 | 0.9 | 14.0 |
| A103 | 1.0 | 34.0 |
| A400 | 1.5 | 69.0 |
| A600 | 1.5 | 69.0 |
| A830 | 1.5 | 69.0 |
| A847 | 1.4 | 69.0 |
| A850 | 1.5 | 57.0 |
| A860 | 1.6 | 63.0 |
| AP250 | 1.4 | 57.0 |
| AP400 | 1.1 | 31.0 |
| AP500 | 1.1 | 34.0 |
| AP800 | 0.6 | 20.0 |
| SST60S | 1.5 | 69 |

TABLE 1.3

Color Values of Corn Oil Treated with Resins Available from Rohm & Haas Corp., Philadelphia, Pennsylvania.

| | Feed oil | |
|---|---|---|
| Resin | Red 1.7 | Yellow 63.0 |
| XE243 | 1.1 | 39.0 |
| XE340 | 0.6 | 23.0 |
| XE586 | 0.3 | 1.9 |
| XAD1090 | 1.0 | 34.0 |
| XAD1180 | 1.2 | 51.0 |
| XAD1600 | 1.3 | 51.0 |
| XAD16HP | 1.3 | 46.0 |
| XJ594 | 1.5 | 69.0 |
| IRA67 | 1.1 | 51.0 |
| IRA94 | 1.0 | 34.0 |
| IRA440 | 2.0 | 70.0 |
| IRA958 | 1.9 | 69.0 |
| IRC84 | 0.2 | 2.3 |
| IRC718 | 1.2 | 46.0 |
| A21 | 1.0 | 27.0 |
| 440 | 1.8 | 57.0 |
| CR1320-IA | 1.6 | 57.0 |

TABLE 1.4

Color Values of Corn Oil Treated with Resins Available from Dow Chemical Co., Midland, Michigan.

| | Feed oil | |
|---|---|---|
| Resin | Red 3.8 | Yellow 70.0 |
| 7373050 | 0.2 | 1.5 |
| 2437485 | 0.0 | 0.7 |
| XUS43569 | 0.2 | 1.8 |
| 2270753 | 1.1 | 28.0 |
| MC-3 | 1.5 | 69.0 |
| 275824 | 1.3 | 46.0 |
| 7352691 | 1.2 | 39.0 |
| 2287157 | 1.2 | 51.0 |
| 7470163 | 1.1 | 57.0 |
| 2713146 | 1.2 | 28.0 |
| 2357450 | 1.5 | 69.0 |
| 7379013 | 1.3 | 51.0 |
| XU43520 | 1.1 | 39.0 |
| MAC3 | 1.4 | 69.0 |
| XUS40197 | 1.4 | 70.0 |
| 40285 | 0.7 | 12.0 |
| N406 | 1.5 | 69.0 |

Example 2

In this Example, 19 resins from Example 1 which displayed the best color reduction were selected and tested in a continuous column setting. The color reduction observed for alkali-refined corn oil was measured.

Each of the resins were dried as set forth in Example 1. The resins (Bed Volume ("BV")=60 mL) were packed into glass columns with a 2.4 cm diameter. A miscella formed by mixing crude-refined corn oil and hexanes (1:1 oil:hexane by volume) was prepared as the feed with a feed flow rate of 50-55 mL/hr. Samples were taken after the resins had been flushed with 300 mL of the feed and the solvent was removed from the oil samples prior to color measurement. The feed oil had color values of 10.7 red and 70 yellow on the Lovibond scale, and a free fatty acid ("%ffa") content of 0.048%. The color of the sample was measured with a Lovibond Tintometer PFX990 with a 5.25 inch cell (13.34 mm).

The results from the continuous testing are presented in Table 2. Certain resins showed reduced effectiveness in the column setting compared to a batch process. As a result of this Example, four strong cationic ion exchange resins, Dowex Monosphere 88®, Dow XUS 43569™, Purolite MN500™, and Mitsubishi EXCO4™, that displayed the highest color reduction were chosen for further testing

TABLE 2

Color Reduction of Alkali-Refined Corn Oil in Miscella Passed Through Resin Columns.

| | | Feed oil | |
|---|---|---|---|
| Manufacturer | Resin | Red color 10.7 | Yellow color 70 |
| Mitsubishi | EXC04 | 1.3 | 22 |
| Dow | XUS 43569 | 3.3 | 70 |
| Dow | 7373050 | 0.5 | 11 |
| Dow | 2437485 | 5.4 | 70 |
| Rohm & Haas | XE 586 | 9.8 | 70 |
| Mitsubishi | HP 20 | 9.5 | 70 |
| Rohm & Haas | XE 340 | 8.9 | 70 |
| Purolite | AP 500 | 9.2 | 70 |
| Mitsubishi | CR 20 | 8.3 | 70 |
| Dow | 275824 | 8.9 | 70 |
| Purolite | MN 500 | 3.5 | 70 |
| Dow | 40285 | 7.6 | 70 |
| Purolite | MN 400 | 9.8 | 70 |
| Dow | 7379013 | 8.9 | 70 |
| Mitsubishi | SF 850 | 9.4 | 70 |
| Purolite | MN 150 | 7.1 | 70 |
| Rohm & Haas | IRA-94 | 9.0 | 70 |
| Dow | 2758824 | 9.9 | 70 |
| Dow | 2713146 | 8.5 | 70 |

Example 3

In this Example, four strong cationic ion exchange resins from Example 2 were selected for further testing using the continuous reactor setting. The selected resins were tested in columns for longer periods of time and the color reduction of alkali-refined corn oil was measured.

The four strong cationic ion exchange resins, Dowex Monosphere® 88, Dow XUS 43569™, Purolite MN500™, and Mitsubishi EXCO4™, were dried as set forth in Example 1. The resins (BV=90 mL) were packed into glass columns with a 2.4 cm diameter. A miscella formed by mixing crude-refined corn oil and hexanes (1:1 oil:hexane by volume) was prepared as the feed with a feed flow rate of 50-55 mL/hr. Approximately 3000 mL of the miscella mixture was passed through the bed of the resins and the resin treated mixtures were collected for oil analysis. Color, peroxide value, para-anisidine value, tocopherol content, conjugated diene content, and trace metal content were measured for each resin treated oil. The color of the sample was measured with a Lovibond Tintometer PFX990 with a 5.25 inch cell (13.34 mm). The results are presented in Tables 3.

TABLE 3

Color Values of Corn Oil Miscella Passed Through Columns of Strong Cationic Ion Exchange Resins.

| | Feed oil | EXC04 | MN 500 | XUS 43569 | 7373050 |
|---|---|---|---|---|---|
| Treated volume (mµ) | | 3600 | 2870 | 3470 | 2815 |
| Red | 10.6 | 2.3 | 4.3 | 3.2 | 4.6 |
| Yellow | 70 | 51 | 70 | 70 | 70 |
| Chlorophyll (ppb) | 0 | 0 | 0 | 0 | 0 |
| Peroxide value (meq/Kg oil) | 7.01 | 1.27 | 1.21 | 1.87 | 1.57 |
| para-Anisidine value | 6.06 | 4.06 | 4.95 | 5.04 | 4.5 |
| Conjugated dienes | 3.27 | 2.04 | 2.06 | 2.33 | 2.25 |
| Trace metals (in ppm) | | | | | |
| P | 3.84 | nd | nd | nd | nd |
| Ni | nd | nd | nd | nd | nd |
| Cu | nd | nd | nd | nd | nd |
| Mg | 4.71 | nd | nd | nd | nd |
| Ca | 1.36 | nd | nd | nd | nd |
| Fe | nd | nd | nd | nd | nd | nd = not detected

All strong cationic ion exchange resins tested were effective in reducing the red color values, peroxide values, para-anisidine values, conjugated diene values, and trace metal content of the treated corn oils.

Example 4

In this Example, the effect of deodorization on the color of the resin treated corn oil was examined.

As the control, crude corn oil from an Archer-Daniels-Midland Co. processing plant (ADM Corn Plant, Decatur, Ill.) was lab-processed by crude-refining followed by conventional bleaching and deodorization. Miscella refined corn oil was prepared by mixing crude corn oil with hexanes (70:30, corn oil:hexanes, vol:vol) and miscella refining at the laboratory scale. This miscella refined corn oil was then bleached with various amounts of bleaching clay and carbon, followed by deodorization. For the resin treatment, Mitsubishi EXCO4™ strong cationic ion exchange resin was used. The pre-dried resin (35 g) was packed into a column 2.5 cm in diameter (about 85 mL bed volume). The miscella refined corn oil, containing about 30% hexanes) was treated by passage through the column of Mitsubishi EXCO4™ strong cationic ion exchange resin as described in Example 3. The flow rate of the feed was 68 g/hr and, after an initial one-hour flush, the column effluent was collected for 5 hours. The solvent was removed and the resulting decolorized oil was subjected to bleaching and deodorization conditions. The color of the resin treated oil was 2.3 red and 51 yellow on the Lovibond scale. The resin treated oil (350 g) was deodorized at 245° C. (±5° C.) and approximately 0.5 torr for 30 minutes.

For comparison, bleaching was carried out by treating miscella-refined corn oil with bleaching clay and/or carbon. The oil was taken up in a vessel and heated while being agitated with a paddle stirrer at 400 to 500 rpm. After the oil had reached 70° C., activated bleaching clay (OilDri Perform 5000) in the amounts indicated in the column "Bleach clay dose (%)" in Table 4 was added and agitation was continued at 70° C. for 5 minutes. Vacuum (max. 5 torr) was applied to the vessel and the mixture was heated to 110° C. at a rate of 2° to 5° C./min. After the mixture reached 110° C., stirring and vacuum were continued for 20 minute. At the end of the 20 minutes, agitation was discontinued and the heat source was removed. After allowing the activated bleaching clay to settle for 5 minutes, the oil temperature had cooled to less than 100° C. The vacuum was released and a sample of oil was vacuum filtered using a Buchner funnel and Whatman #2 filter paper. Carbon treatment was carried out simultaneously with bleaching using the same procedure except 1% KBG carbon was added to the mixture.

Deodorizing was carried out by taking up the treated oil in a vessel. The vessel was fitted with a sparge tube, one opening of which was below the top of the oil level. The other opening of the sparge tube was connected to a vessel containing deionized water. The sparge tube was set to provide a total content of sparge steam of 3%, by weight, of oil throughout the deodorization process. The vessel was also fitted with a condenser through an insulated adapter. A vacuum line was fitted to the condenser, with a cold trap located between the condenser and the vacuum source. A vacuum (max. 1 torr pressure) was applied and the oil was heated to 245° C. (±5° C.) at a rate of 10° C./minute. The temperature was held for 30 minutes. A heat lamp was applied to the vessel containing deionized water to generate steam, and the vacuum drew the steam through the sparge tube into the hot oil, thus providing sparge steam. After 30 minutes, the vessel was removed from the heat source and the steam stopped. After the oil had cooled to below 100° C., the vacuum was broken with nitrogen gas.

The color of each sample was measured with a Lovibond Tintometer PFX990 with a 5.25 inch cell (13.34 mm). The red color value and the para-anisidine value ("p-AV") of each treated oil are presented in Table 4. The color of the resin treated-deodorized oil had a free fatty acid content of 0.011%. The resin treated oil had lower red color values, para-anisidine values and heated red color values compared the oil samples treated by conventional methods.

TABLE 4

Red Color of Corn Oil After Conventional Oil Refining and Resin Decolorization.

| Oils before bleaching | Red color, before bleach | Bleach clay dose (%) | Carbon dose (%) | Red color, after bleach | p-AV, after bleach | Red color, after deodo. | p-AV after deodo. |
|---|---|---|---|---|---|---|---|
| Conventional crude-refined corn oil | 9.8 | 0.5 | 0 | 7.0 | 7.8 | 2.0 | 8.06 |
| Miscella refined | 8.8 | 0.5 | 0 | 5.4 | 6.8 | 1.9 | 5.93 |
| Miscella refined | 8.9 | 0.8 | 0 | 4.6 | 8.6 | 1.7 | 6.37 |
| Miscella refined | 8.9 | 1.1 | 0 | 4.2 | 10.5 | 1.5 | 6.82 |
| Miscella refined | 8.9 | 1.5 | 0 | 4 | 10.6 | 1.6 | 6.64 |
| Miscella refined | 8.5 | 1.5 | 1 | 3.1 | 5.6 | 1.2 | 3.29 |
| Miscella refined, EXC04 bleached | 8.5 | 0 | 0 | 1.3 | 3.2 | 0.4 | 1.99 |

Example 5

In this Example the color stability of resin treated-deodorized corn oil was measured and compared to the color stability of conventionally refined corn oil. The conventionally refined corn oil was refined using various amounts of bleaching clay and carbon followed by deodorization.

As the control, crude corn oil from an Archer-Daniels-Midland Co. processing plant (ADM Corn Plant, Decatur, Ill.) was lab-processed by crude-refining followed by conventional bleaching and deodorization. Miscella refined corn oil was prepared by mixing crude corn oil with hexanes (70:30, corn oil:hexanes, vol:vol) and miscella refining at the laboratory scale. This miscella refined corn oil was then bleached with various amounts of bleaching clay and carbon, followed by deodorization. For the resin treatment, Mitsubishi EXCO4™ strong cationic ion exchange resin was used. The pre-dried resin (35 g) was packed into a column 2.5 cm in diameter (about 85 mL bed volume). The miscella refined corn oil, containing about 30% hexanes) was treated by passage through the column of Mitsubishi EXCO4™ strong cationic ion exchange resin as described in Example 3. The flow rate of the feed was 68 g/hr and, after an initial one-hour flush, the column effluent was collected for 5 hours. Hexane was removed from the resin treated corn oil and the controls. The resin treated corn oil and the controls were deodorized for 30 minutes at 245° C. (±5° C.) and less than 2 torr pressure.

The heated and aged red color values were measured for each corn oil sample to estimate color stability. To test the heated color value, the corn oil samples were heated to 160° C. on a pre-warmed hot plate with gentle stirring, removed from the heat when the oil temperature reaches 160° C., and allowed to cool to about room temperature. The color of the heated oil sample was measured with a Lovibond Tintometer PFX990 with a 5.25 inch cell (13.34 mm). To test the aged red color value, the corn oil samples were stored in the dark at 63° C. for 7 days, under AOCS Cg 5-97, and the color of the sample was measured with a Lovibond Tintometer PFX990 with a 5.25 inch cell (13.34 mm). The results of the test are presented in Table 5.

TABLE 5

Aged Color Stability of Treated Corn Oil.

| Oils before bleaching | Red color, before bleach | Bleach clay dose (%) | Carbon dose (%) | Red color, after bleach | Red color, after deodo. | p-AV after deodo. | Heated red color | Red color 3 days | Red color 4 days | Red color 5 days | Red color 7 days |
|---|---|---|---|---|---|---|---|---|---|---|---|
| Conventional crude-refined corn oil | 9.8 | 0.5 | 0 | 7.0 | 2.0 | 8.06 | 2.9 | 3.6 | nd | 4.0 | 4.3 |
| Miscella refined | 8.8 | 0.5 | 0 | 5.4 | 1.9 | 5.93 | 2.5 | 3.0 | nd | 3.4 | 4.2 |
| Miscella refined | 8.9 | 0.8 | 0 | 4.6 | 1.7 | 6.37 | 2.2 | nd | 3.2 | 3.4 | 4.2 |
| Miscella refined | 8.9 | 1.1 | 0 | 4.2 | 1.5 | 6.82 | 2.2 | nd | 3.5 | 4.0 | 4.6 |
| Miscella refined | 8.9 | 1.5 | 0 | 4 | 1.6 | 6.64 | 2.1 | nd | 3.6 | 4.2 | 5.4 |
| Miscella refined | 8.5 | 1.5 | 1 | 3.1 | 1.2 | 3.29 | 1.5 | 2.6 | nd | 3.0 | 3.2 |
| Miscella refined, EXC04 bleached | 8.5 | 0 | 0 | 1.3 | 0.4 | 1.99 | 0.5 | 1.4 | nd | 1.5 | 1.6 |

The resin treated-deodorized corn oil had a red color value of 0.4 on the Lovibond scale, as compared to 2.0 red for the control. The resin treated-deodorized oil had lower red color values for the heat color test and the age color test than the control.

Although the foregoing description has presented a number of embodiments of the invention, those of ordinary skill in the relevant art will appreciate that various changes in the components, details, materials, and process parameters of the examples that have been herein described and illustrated in order to explain the nature of the invention may be made by those skilled in the art, and all such modifications will remain within the principle and scope of the invention as expressed herein in the appended claims. It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the principle and scope of the invention, as defined by the claims.

We claim:

1. A method for producing a decolorized corn oil, the method comprising:
   obtaining corn oil from wet corn milling;
   refining the corn oil;
   mixing the refined corn oil with a non-polar organic solvent, thus producing a composition; and,
   placing the composition in contact with a cationic ion exchange resin such that color bodies in the refined corn oil are bound by the cationic exchange resin, thus producing a decolorized corn oil composition.

2. The method of claim 1, wherein the cationic ion exchange resin is a dried cationic ion exchange resin.

3. The method of claim 1, further comprising removing the non-polar organic solvent from the decolorized corn oil composition.

4. The method of claim 1, wherein the non-polar organic solvent is selected from the group consisting of pentane, hexane, heptane, octane, petroleum ether, isomers of any thereof, and mixtures of any thereof.

5. The method of claim 1, wherein placing the composition in contact with the cationic ion exchange resin comprises stirring the composition with the cationic ion exchange resin.

6. The method of claim 1, wherein placing the composition in contact with the cationic ion exchange resin comprises passing the composition through the cationic ion exchange resin.

7. The method of claim 1, further comprising removing the decolorized corn oil composition from the cationic ion exchange resin.

8. The method of claim 7, wherein removing the decolorized corn oil composition from the cationic ion exchange resin comprises an act selected from the group consisting decanting the decolorized corn oil composition from the cationic ion exchange resin, filtering the decolorized corn oil composition from the cationic ion exchange resin, passing the decolorized corn oil composition through the cationic ion exchange resin, and combinations of any thereof.

9. The method of claim 7, further comprising regenerating the cationic ion exchange resin after removing the decolorized corn oil composition from the cationic ion exchange resin.

10. A method for producing a decolorized corn oil, the method comprising:
   refining corn oil from wet corn milling;
   mixing the refined corn oil with a non-polar solvent, thus producing a composition;
   passing the composition through cationic ion exchange resin such that color bodies, impurities of the corn oil or a combination thereof bind to the cationic exchange resin, thus producing a decolorized corn oil composition;
   collecting the decolorized corn oil composition; and removing the non-polar solvent from the decolorized corn oil composition, thus producing a decolorized corn oil having at least one of a color value of less than 2.5 red on the Lovibond scale and a color value of less than 60.0 yellow on the Lovibond scale.

11. The method of claim 1, wherein contacting the composition with a cationic ion exchange resin is performed in a reactor selected from the group consisting of a batch reactor, a semi-continuous reactor, a continuous reactor, and combinations of any thereof.

12. The method of claim 6, wherein passing the composition through the cationic ion exchange resin comprises passing the composition through a column of the cationic ion exchange resin.

13. The method of claim 12, wherein the column comprises a ratio of resin volume to column diameter of 15 mL resin per cm diameter to 50 mL resin per cm diameter.

14. The method of claim 1, further comprising heating the decolorized corn oil composition at a temperature of 180° C. to 280° C. and a pressure of 0.5 torr to 10 torr for 5 minutes to 120 minutes.

15. The method of claim 10, further comprising deodorizing the decolorized corn oil composition at a temperature of 180° C. to 280 ° C. and a pressure of 0.5 torr to 10 torr for 5 minutes to 120 minutes.

16. The method of claim 9, wherein regenerating the cationic ion exchange resin comprises removing at least a portion of the color bodies bound to the cationic ion exchange resin.

17. The method of claim 1, further comprising de-gumming the composition.

18. The method of claim 1, further comprising bleaching the composition.

19. The method of claim 10, wherein the red color value of the decolorized corn oil comprises a reduction (delta R) of from 0.4 to 15 on the Lovibond scale.

20. The method of claim 1, wherein the refining comprises miscella refining.

21. The method of claim 1, wherein the refining comprises crude-refining.

22. The method for producing a decolorized corn oil, the method comprising:
    mixing a refined corn oil from wet corn milling with a non-polar organic solvent, thus producing a composition;
    placing the composition in contact with a cationic ion exchange resin; and
    removing the non-polar organic solvent to yield a decolorized corn oil such that a reduction in color of the decolorized plant oil of greater than 2 units as compared to the refined corn oil is obtained.

23. The method of claim 1, wherein the refined corn oil is deodorized.

* * * * *